United States Patent
Wollenmann

[11] 4,026,630
[45] May 31, 1977

[54] SCANNING APPARATUS USING HOLOGRAPHIC BEAM DEFLECTOR

[75] Inventor: Hans Peter Wollenmann, Rueti, Switzerland

[73] Assignee: International Business Machines Corporation, Armonk, N.Y.

[22] Filed: Dec. 23, 1975

[21] Appl. No.: 644,679

[52] U.S. Cl. ................................. 350/7; 350/3.5
[51] Int. Cl.² ....................................... G02B 27/17
[58] Field of Search ............ 350/7, 6, 3.5, 162 ZP; 235/61.11

[56] References Cited
UNITED STATES PATENTS

| | | | |
|---|---|---|---|
| 3,614,193 | 10/1971 | Beiser | 350/7 |
| 3,703,724 | 11/1972 | Thomas | 350/162 ZP |
| 3,721,487 | 3/1973 | Pieuchard et al. | 350/7 |
| 3,795,768 | 3/1974 | Locke | 350/3.5 |
| 3,907,197 | 9/1975 | Poschl et al. | 350/6 |
| 3,916,158 | 10/1975 | San Sone et al. | 350/6 |
| 3,940,202 | 2/1976 | Kato et al. | 350/3.5 |

*Primary Examiner*—John K. Corbin
*Assistant Examiner*—B. W. de los Reyes
*Attorney, Agent, or Firm*—Otto Schmid, Jr.

[57] ABSTRACT

An omnidirectional scanning apparatus which generates a multiple cross scanning pattern is described. The scanning apparatus comprises a flat ring-shaped hologram. The hologram disk is rotated about its axis as a small area is illuminated by a collimated light source, such as a laser, to produce a series of reconstructed beams which scan segments of a circle. Optical means is provided to intercept the reconstructed beams and reflect them to a scanning window where the segments produce a multiple cross scanning pattern. In a specific embodiment the holograms recorded are reconstructed as segments of concentric circles and the optical means comprises a stationary mirror for each direction of scan across the scanning window.

7 Claims, 8 Drawing Figures

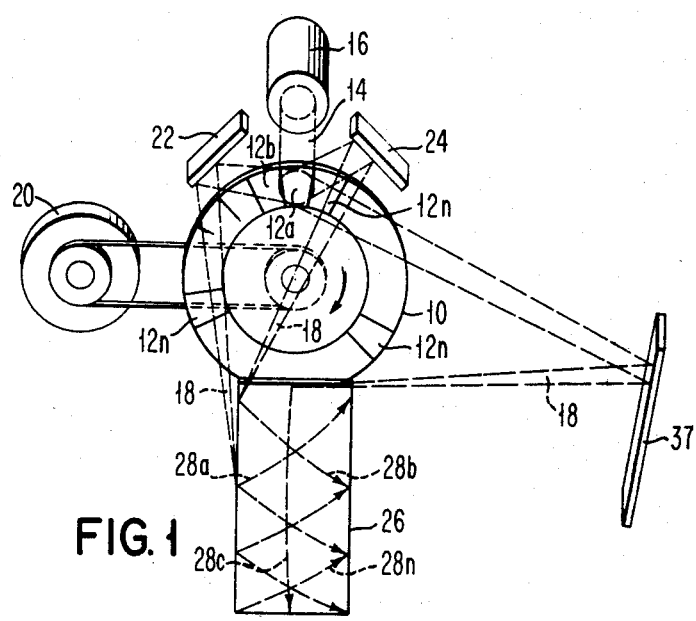
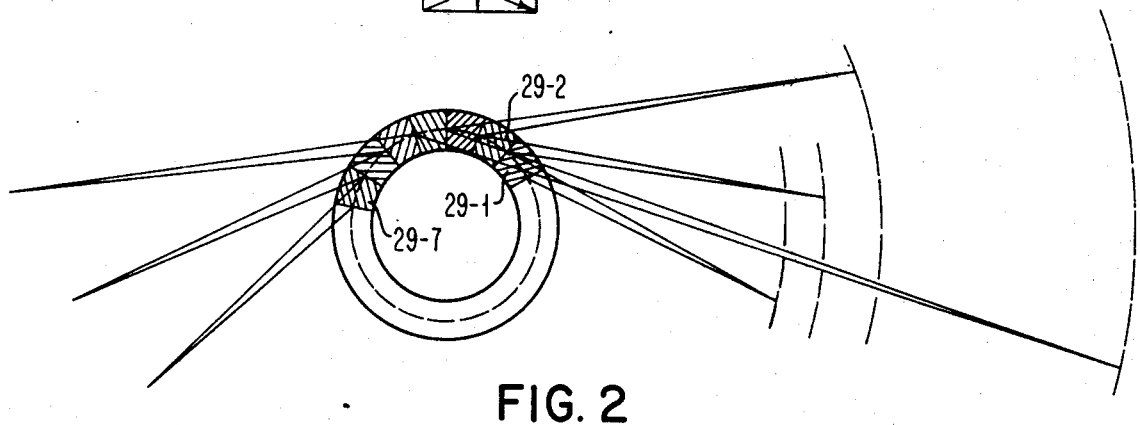
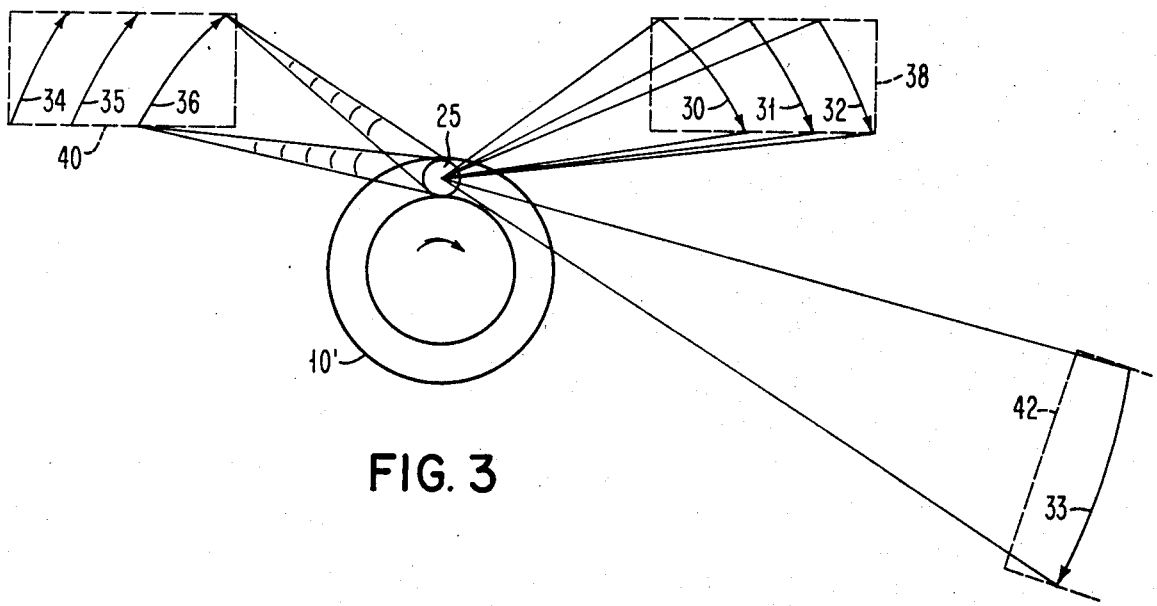

SCANNING APPARATUS USING HOLOGRAPHIC BEAM DEFLECTOR

BACKGROUND OF THE INVENTION

This invention relates to optical scanning systems and more particularly to omnidirectional scanning systems.

There have been available in the prior art omnidirectional systems which finds particular application for scanuing randomly oriented coded labels which, for example, are attached to consumer items being checked out at a counter. The checkout operator merely passes the item over a narrow rectangular scanning window to sense the data from the coded labels. However, the use of the narrow rectangular scanning window requires a multiple cross scanning pattern to insure that the coded label will be properly scanned. Prior art systems utilizing this scanning pattern have generally utilized some arrangement with oscillating or rotating mirrors.

It is the principal object of this invention to produce a simplified and therefore less expensive multiple cross scanning system.

SUMMARY OF THE INVENTION

Briefly, according to the invention, the scanning apparatus comprises a disk member having a plurality of holograms recorded thereon. A small area of the disk member is illuminated by a collimated light source as the disk member is rotated about its axis. Each hologram on the disk produces a reconstructed beam which scans a circular arc. Optical means are provided to intercept the reconstructed beams and to reflect the intercepted beams to a scanning window to produce a multiple cross scanning pattern on the scanning pattern on the scanning window. In a specific embodiment a series of concentric circular segments are produced by the reconstructed beams and the optical means comprises a stationary mirror for each direction of scan across the scanning window.

BRIEF DESCRIPTION OF THE DRAWINGS

FIG. 1 is a schematic view of the scanning apparatus embodying the invention.

FIG. 2 is a diagram showing the geometry illustrating formation of the hologram for one specific embodiment of the scanning apparatus embodying the invention.

FIG. 3 is a diagram showing the scanning segments generated by the subsequent reconstruction of the hologram formed as shown in FIG. 2.

DETAILED DESCRIPTION OF THE PREFERRED EMBODIMENTS

Figure 9:
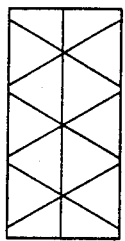
FIG. 9 is a diagram showing the ideal scanning pattern for a multiple cross scanner.

My invention is described in the setting of a checkout stand application, however, it will be recognized by those skilled in the art that the invention is also suitable for other applications.

Referring to the schematic view of the scanning apparatus shown in FIG. 1, the scanning apparatus comprises a holographic disk member 10 having a plurality of hologram 12a, 12b-12n recorded on its periphery. A collimated light beam 14 emitted from laser 16 impinges on disk member 10 to produce a reconstructed convergent beam 18. Motor 20 is connected to holographic member 10 to rotate it about the axis of disk 10 thereby causing the beam 14 to illuminate successive holograms 12. This action causes the reconstructed beam 18 to scan a circular path in a plane parallel to the plane of hologram disk 10. The holograms 12 are recorded so that as each hologram is illuminated by beam 14, the reconstructed beam 18 scans a predetermined circular segment 28a, 28b-28n.

For convenience in illustrating the shape of the reconstructed beam the cross-sectional area of beam 14 is shown out of proportion relative to the size of holograms 12. The preferred diameter of the illuminating beam cross-sectional area is on the order of one-tenth of the width of the holograms 12.

Figure 10:
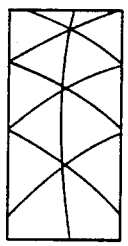
FIG. 10 is a diagram showing the scanning pattern for the embodiment of the scanner shown in FIG. 4.

The patterns shown in FIGS. 9 and 10 are the scanning patterns produced at a suitable scanning window 26. Scanning window 26 is a narrow rectangular aperture formed in the top of an enclosure (not shown) and covered by glass or other suitable material transparent to the light generated by laser 16. The enclosure forms a checkout stand where an item of merchandise bearing a bar coded label is transported over the scanning window so that the label data is recovered by means known in the art.

By the selection of appropriate circular segments 28 and the proper positioning of these segments relative to scanning window 26, a crossed interlaced scanning pattern can be produced as shown in FIG. 10 which approximates the ideal crossed scanning pattern shown in FIG. 9. The larger the radius of the circular segments 28, the closer the approximation comes to the ideal scanning pattern. The allowable radius for the segments is determined by the tolerance on the diameter of the reconstructed light spot and the tolerable angle of incidence of the reconstructed light beam with respect to scanning window 26.

Optical means are provided to intercept the reconstructed beams and to reflect the intercepted beam to the scanning window 26 so that the various segments 28 are positioned in their proper relative positions to produce the approximations to the scanning pattern shown in FIG. 10.

To produce the scanning pattern shown in FIG. 1, a first optical means 22 is provided to intercept a first reconstructed beam 18 and reflect it to a first orientation on scanning window 26 to produce a first scanning segment 28a. A second optical means 24 is provided to intercept a second reconstructed beam 18 ad reflect it to a second orientation on scanning window 26 to produce a second scanning segment 28b which intersects segment 28a at an angle substantially midway of the narrow dimension of the scanning window 26 to form a crossed scanning pattern. Third optical means 37 is provided to intercept a third reconstructed beam 18 and reflect it to a third orientation on scanning window 26 to produce a third scanning segment 28c which essentially bisects the area of scanning window 26 and produces a common intersection point with scanning segments 28a and 28b. The other scanning segments are produced in a similar manner. The set of holograms 12a, 12b-12n required to produce one scanning pattern can be repeated several times along the circumference of the disk 10 so that the whole scanning pattern is run through several times in one revolution of the disk.

The principle of operation of the scanning apparatus can be better understood by referring to the diagrams shown in FIGS. 5, 6, 7 and 8. Holographic disc member 10 is formed from any suitable material and at least the outer peripheral area 11 is transparent to the light from laser 16. The holograms 12 are recorded on area 11 while the disk is rotated about an axis through the center of the disk 10. The reference wave 15 (see FIG. 6) at the hologram recording stage has rotational symmetry with respect to the axis through the center of disk member 10 and the reference wave 15 is a collimated beam incident perpendicular to the hologram plane. The object beam 17 is a spherically divergent wave whose origin is located at the distance R from the axis of rotation and the distance H from the hologram plane. In the reconstruction step the hologram is illuminated by the conjugate reference wave 19, which is a collimated beam propagating in the opposite direction from the reference wave. If the whole hologram is illuminated by that beam, a ring section of a spherical wave will be reconstructed which converges toward the origin of the former object wave. If the hologram is rotated, this reconstructed point describes a circular path of radius R in a parallel plane to the hologram plane at the distance H. However, if only a sector 21 of the ring hologram was made (see FIG. 7) and is now illuminated, only the corresponding part of the spherical wave will be reconstructed. The central ray of the reconstructed wave 23 forms an angle $\alpha$ with the accompanying hologram radius (see FIG. 8). By choosing the suitable sector of the whole ring $\alpha_r - \alpha_e$, the angle $\alpha$ can be adjusted to any desired value within the range $\pm 180°$. If the reconstruction beam is fixed illuminating only a relatively small area 25 while the hologram is rotating, a point is reconstructed which scans a part 27 of the circular path of radius R when the previously recorded hologram sector passes the illuminated area.

Thus, for a fixed position of the reconstruction beam and any given segment of a concentric circle of radius R and distance H from the hologram plane, it is possible to find an appropriate sector on the hologram ring of radius R, so that a previously recorded hologram on this sector will make the reconstructed point to scan exactly the desired segment.

For the embodiment of the scanning apparatus shown in FIG. 3, the hologram disk member 10' is recorded with seven different hologram segments 29-1, 29-2, - 29-7 recorded on seven ring sectors following each other (see FIG. 2). The adjacent areas are masked off as each of these segments is recorded. The angles $\alpha_r$ and $\alpha_e$ of each hologram are chosen so that the line segments 30-36 (see FIG. 4) are scanned subsequently by the reconstructed beams when the seven segments are rotated past the laser beam.

Figure 4:
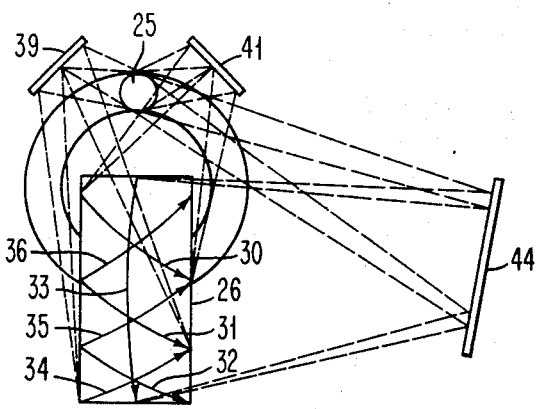
FIG. 4 is a diagram showing a specific embodiment of apparatus for producing the superposition of the various scanning segments shown in FIG. 3 onto a scanning window by the use of stationary mirrors.
Figures 5, 6:
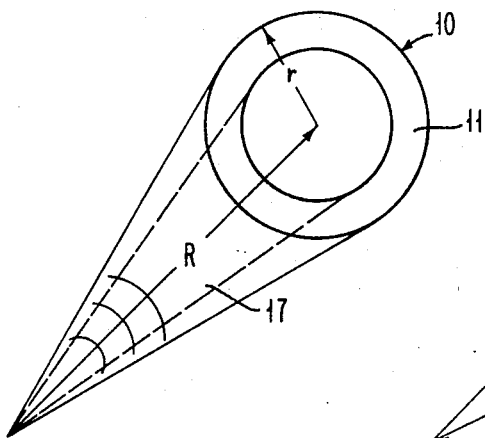
FIG. 5 is a diagram showing the geometry illustrating the formation of a ring shaped hologram.
FIG. 6 is a side view of the diagram of FIG. 5 showing the geometry illustrating the formation of a ring-shapedhologram.
Figures 7, 8:
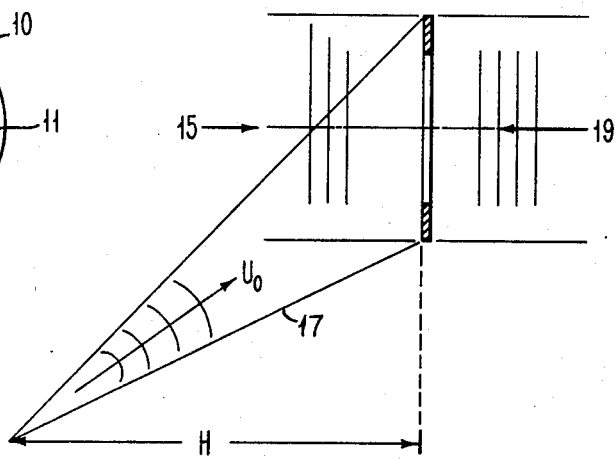
FIG. 7 is a diagram showing the geometry relating to the formation of a hologram on a ring sector.
FIG. 8 is a diagram illustrating the dependence of the scanning angle upon the position of a recorded sector hologram.

In the specific embodiment of the invention shown in FIGS. 3 and 4 the hologram disk member 10' is recorded so that illumination of a small area 25 (as previously mentioned, the cross-sectional area of the illumination beam, such as 25, is much smaller than that shown in FIG. 3) of the disk by beam 14 and subsequent rotation of disk member 10' produces seven reconstructed beams which scan segments 30, 31, 32, 33, 34, 35, 36. Each of the segments 30-36 represents a segment of a concentric circle and segments 30, 31, 32 produce spaced scans in one direction at an angle across window area 38. Segments 34, 35, 36 produce spaced scans in the opposite direction at an angle across window area 40. Segment 33 essentially bisects the window area 42. In this embodiment the first optical means comprises a stationary plane mirror 39 positioned to intercept the beams which produce segments 34, 35, 36 and reflect these segments to scanning window 26. In this embodiment the second optical means comprises a stationary plane mirror 41 positioned to intercept the beams which produce segments 30, 31, 32 and reflect these segments to scanning window 26. In addition, the third optical means comprises a stationary plane mirror 44 positioned to intercept the beam which forms segment 33 and to reflect this beam to scanning window 26. The composite of the seven scanning segments on scanning window 26 produces the crossed scanning pattern shown in FIG. 10.

One specific embodiment of the apparatus using segments of concentric circles to produce a crossed scanning pattern has been shown and described. Many other embodiments will occur to those skilled in the art. For example, another embodiment for the apparatus comprises recording a series of holograms which when reconstructed produce sets of shifted segments of circles, all of the same radius R. In this case, a fixed plane mirror is required for each segment to be scanned and each mirror is set at a different angle to direct these segments to the interlaced cross-scanning pattern at the scanning window.

While the invention has been particularly shown and described with reference to a preferred embodiment thereof, it will be understood by those skilled in the art that various changes in the form and details may be made therein without departing from the spirit and scope of the invention.

What is claimed is:

1. An omnidirectional scanning system for scanning bar coded labels on randomly oriented articles comprising:

an elongated scanning window;

a disk member having a plurality of hologram segments recorded thereon, each of said hologram segments, when reconstructed, producing a point image, each of said reconstructed hologram segments producing different points in a plane which is parallel to the plane containing said hologram segments;

a collimated light source providing a beam of light directed to illuminate a small area of said hologram segments;

means for rotating said disk member about its axis so that each hologram segment on said disk member, when illuminated, produces a reconstructed point image which scans a circular arc;

first optical means fixed in a position to intercept the reconstructed beam from one of said holograms and to reflect the intercepted beam to said scanning window to produce a first scanning segment; and second optical means fixed in a position to intercept the reconstructed beam from another of said holograms and to reflect the intercepted beam to said scanning window to produce a second scanning segment intersecting the first scanning segment to produce a cross scanning pattern.

2. The scanning system according to claim 1 additionally comprising third optical means fixed in a position to intercept the reconstructed beam from a third of said plurality of holograms and to reflect the intercepted beam to said scanning window to produce a third scanning segment intersecting said first and said second scanning segments.

3. The scanning system of claim 2 wherein said first and said second optical means each intercept a plurality of said reconstructed beams so that a plurality of cross scanning patterns is produced on said scanning window.

4. The scanning system of claim 3 wherein the hologram segments to produce a complete scanning pattern on said scanning window are repeated a plurality of times on said disk member so that the entire scanning pattern is produced a plurality of times for each revolution of said disk member.

5. The scanning system of claim 1 wherein said first and said second optical means each intercept a plurality of said reconstructed beams so that a plurality of cross scanning patterns is produced on said scanning window.

6. The scanning system in claim 1 wherein said collimated light source is a laser.

7. The scanning system of claim 1 wherein said plurality of hologram segments recorded on said disk member comprises one hologram segment for each of said scanning segments produced on said scanning window.

* * * * *